(12) United States Patent
Ishii et al.

(10) Patent No.: US 6,980,807 B2
(45) Date of Patent: Dec. 27, 2005

(54) PATH TIMING DETECTING METHOD IN MOBILE COMMUNICATIONS SYSTEM AND BASE STATION

(75) Inventors: Minami Ishii, Kanagawa (JP); Takehiro Nakamura, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 909 days.

(21) Appl. No.: 09/750,814

(22) Filed: Dec. 28, 2000

(65) Prior Publication Data

US 2001/0041573 A1 Nov. 15, 2001

(30) Foreign Application Priority Data

Dec. 28, 1999 (JP) .......................................... 11-375741

(51) Int. Cl.[7] .......................... H04Q 7/20; H04B 7/216
(52) U.S. Cl. ..................... 455/450; 455/452.1; 370/320
(58) Field of Search ............................... 455/450, 451, 455/452.1, 452.2; 370/328, 241, 252

(56) References Cited

U.S. PATENT DOCUMENTS

| 5,604,730 A | * | 2/1997 | Tiedemann, Jr. ............ 370/252 |
| 6,163,696 A | * | 12/2000 | Bi et al. ...................... 455/436 |
| 6,256,301 B1 | * | 7/2001 | Tiedemann et al. ......... 370/342 |
| 6,606,313 B1 | * | 8/2003 | Dahlman et al. ........... 370/347 |

FOREIGN PATENT DOCUMENTS

| JP | 11-251993 | 9/1999 | ............ H04B/7/26 |
| KR | 00258221 B1 | 9/2000 | |
| WO | WO 99/65157 | 12/1999 | |

OTHER PUBLICATIONS

Akio Aoyama, et al., "Path–Search Performance Of DS–CDMA System In Laboratory And Field Experiments," IEICE General Convention 1998, B–5–101, p. 465, Mar. 1998.

Akio Aoyama, et al., "Path–Timing Selection Method of DS–CDMA For Small Delay Spread Environment," IEICE General Convention 1997, B–5–25, p. 412, Mar. 1997.

Satoru Fukumoto, et al., "Performance Of Pilot–Symbols Assisted Matched Filter Rake Receiver With Two–Stage Multipath Selection Threshold For Wideband DS–CDMA," Technical Report Of IEICE, A.P97–104, RCS97–119, pp. 43–48, Oct. 1997.

Sadayuki Abeta, et al., "Coherent Block Demodulation Of W–CDMA Packet Data Transmitted Over Frequency Selective Fading Channels," IEEE Wireless (Held By TRLabs Communications Research Centre, IEEE Canada), C–4, pp. 146–151, Jul. 1998.

* cited by examiner

*Primary Examiner*—David Hudspeth
*Assistant Examiner*—Sheila Smith
(74) *Attorney, Agent, or Firm*—Workman Nydegger

(57) ABSTRACT

A path timing detecting method and a base station are provided which can improve the accuracy of detecting the path timings and check an increase in the processing load in the random access in a mobile communications system. First, the method identifies the effective path timing range using a preamble, followed by detecting effective path timings in the identified path timing range at reception of a message, enabling the method to carry out detection of the path timings at accuracy higher than a conventional method that detects the paths using only the preamble. Besides, identifying the searching range at the reception of the preamble makes it possible to reduce the processing load as compared with a method that detects the path timings from the entire searching range corresponding to a cell radius.

4 Claims, 3 Drawing Sheets

PATH TIMING DETECTING METHOD IN MOBILE COMMUNICATIONS SYSTEM AND BASE STATION

This application is based on Japanese Patent Application No. 11-375741 (1999) filed Dec. 28, 1999, the content of which is incorporated hereinto by reference.

BACKGROUND OF THE INVENTION

1. Field of the Invention

The present invention relates to a path timing detecting method in a mobile communications system and a base station. More specifically, it relates to a path timing detecting method in a mobile communications system and a base station applicable to path detection in random access in a CDMA mobile communications system.

2. Description of the Related Art

A conventional mobile station in a mobile communications system transmits a preamble notifying of the occurrence of a message to a base station before transmitting a message so that the base station can identify an effective range of path timings using the preamble.

Thus, in the random access of the conventional mobile communications system, the base station detects the path timings using only the preamble.

However, the detection of the path timings using only the preamble presents an unavoidable problem of increasing the probability of ending the detection in failure. This is not only because the short duration of 1 ms long preamble cannot provide sufficient averaging, but also because the detection accuracy of the path timings is degraded by a time delay from the preamble to message reception.

Thus, the path timing detecting method in the random access in the mobile communications system presents an unavoidable problem of low detection accuracy, making it difficult to detect the effective path timings.

SUMMARY OF THE INVENTION

The present invention is implemented to solve the foregoing problem. It is therefore an object of the present invention to provide a path timing detecting method and a base station that can improve the accuracy of detecting the path timings, with checking an increase in the processing load as much as possible.

To accomplish the object of the present invention, according to the first aspect of the present invention, there is provided a path timing detecting method in a mobile communications system, in which when a plurality of mobile stations access a base station using a common channel at arbitrary timings, each mobile station transmits a preamble for notifying the base station of an occurrence of a massage before actually transmitting the message, the base station transmits, in response to reception of the preamble, a transmission control signal authorizing the mobile station to transmit the message, and the mobile station that receives the transmission control signal starts transmitting the message, the path timing detecting method comprising:

a step of identifying an effective path timing range using the preamble received by base station; and a step of detecting effective path timings in the identified path timing range using the message transmitted from the mobile station.

Here, the step of identifying the effective path timing range may determine the effective path timing range as ranging from a start point to an end point, the start point being placed at a timing previous to an earliest one of the path timings detected from the preamble received by the base station by a first time period, and the end point being placed at a timing later than a latest one of the path timings by a second time period.

According to the second aspect of the present invention, there is provided a base station in a mobile communications system, in which when a plurality of mobile stations access the base station using a common channel at arbitrary timings, a mobile station transmits a preamble for notifying the base station of an occurrence of a massage before actually transmitting the message, the base station transmits, in response to reception of the preamble, a transmission control signal authorizing the mobile station to transmit the message, and the mobile station that receives the transmission control signal starts transmitting the message, the base station comprising:

identifying means for identifying an effective path timing range using the preamble received; and detecting means for detecting effective path timings in the identified path timing range using the message transmitted from the mobile station.

Here, the identifying means may determine the effective path timing range as ranging from a start point to an end point, the start point being placed at a timing previous to an earliest one of the path timings detected from the preamble received by the base station by a first time period, and the end point being placed at a timing later than a latest one of the path timings by a second time period.

According to the third aspect of the present invention, there is provided a mobile communications system in which a plurality of mobile stations access a base station at any arbitrary timings using a common channel, wherein the mobile stations each comprises:

means for transmitting a preamble for notifying the base station of an occurrence of a message before actually transmitting the message, and wherein the base station comprises:

means for transmitting, in response to the reception of the preamble sent from the mobile station, a transmission control signal authorizing the mobile station to transmit the message;

identifying means for identifying an effective path timing range from the preamble; and detecting means for detecting effective path timings in the identified path timing range using the message sent from the mobile station.

Here, the identifying means may determine the effective path timing range as ranging from a start point to an end point, the start point being placed at a timing previous to an earliest one of the path timings detected from the preamble received by the base station by a first time period, and the end point being placed at a timing later than a latest one of the path timings by a second time period.

According to the fourth aspect of the present invention, there is provided a storing medium that stores, in a form of a communication control program, a path timing detecting method in a mobile communications system, in which when a plurality of mobile stations access a base station using a common channel at arbitrary timings, a mobile station transmits a preamble for notifying the base station of an occurrence of a massage before actually transmitting the message, the base station transmits, in response to reception of the preamble, a transmission control signal authorizing the mobile station to transmit the message, and the mobile station that receives the transmission control signal starts transmitting the message, the path timing detecting method comprising: a step of identifying an effective path timing range using the preamble received by base station; and a step of detecting effective path timings in the identified path timing range using the message transmitted from the mobile station.

Here, the step of identifying the effective path timing range may determine the effective path timing range as ranging from a start point to an end point, the start point being placed at a timing previous to an earliest one of the path timings detected from the preamble received by the base station by a first time period, and the end point being placed at a timing later than a latest one of the path timings by a second time period.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The invention will now be described with reference to the accompanying drawings.

Figure 1:
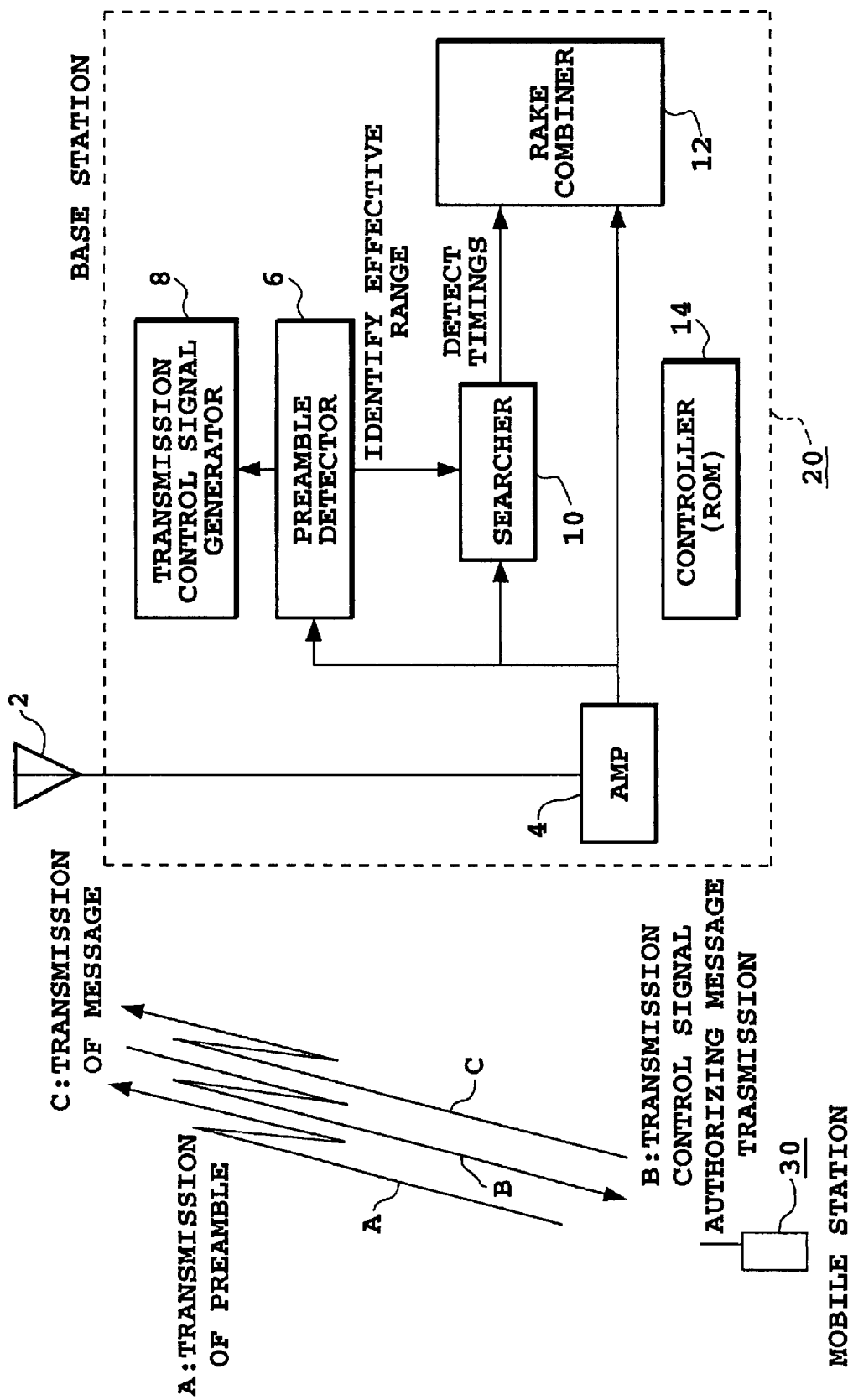
FIG. 1 is a block diagram showing an entire configuration of a mobile communications system in accordance with the present invention.

FIG. 1 is a block diagram showing an entire configuration of a mobile communications system in accordance with the present invention. In FIG. 1, the reference numeral 2 designates a base station antenna; and 4 designates an amplifier with other processing circuits. The reference numeral 6 designates a preamble detector for identifying the effective range of the path timings (see, FIG. 3 which will be described later) by using a received preamble A. The reference numeral 8 designates a transmission control signal generator for generating, in response to the received preamble A, a transmission control signal B that enables/disables the mobile station to transmit a message. The reference numeral 10 designates a searcher for searching for an effective path timings in the identified path timing range. The reference numeral 12 designates a RAKE combiner that operates in response to the timings detected by the searcher 10. The reference numeral 14 designates a controller including a storage (ROM) for storing the path detection procedure of the base station (see, FIG. 2 which will be described later). The reference numeral 20 designates the base station in its entirety, and 30 designates a mobile station.

Figure 2:
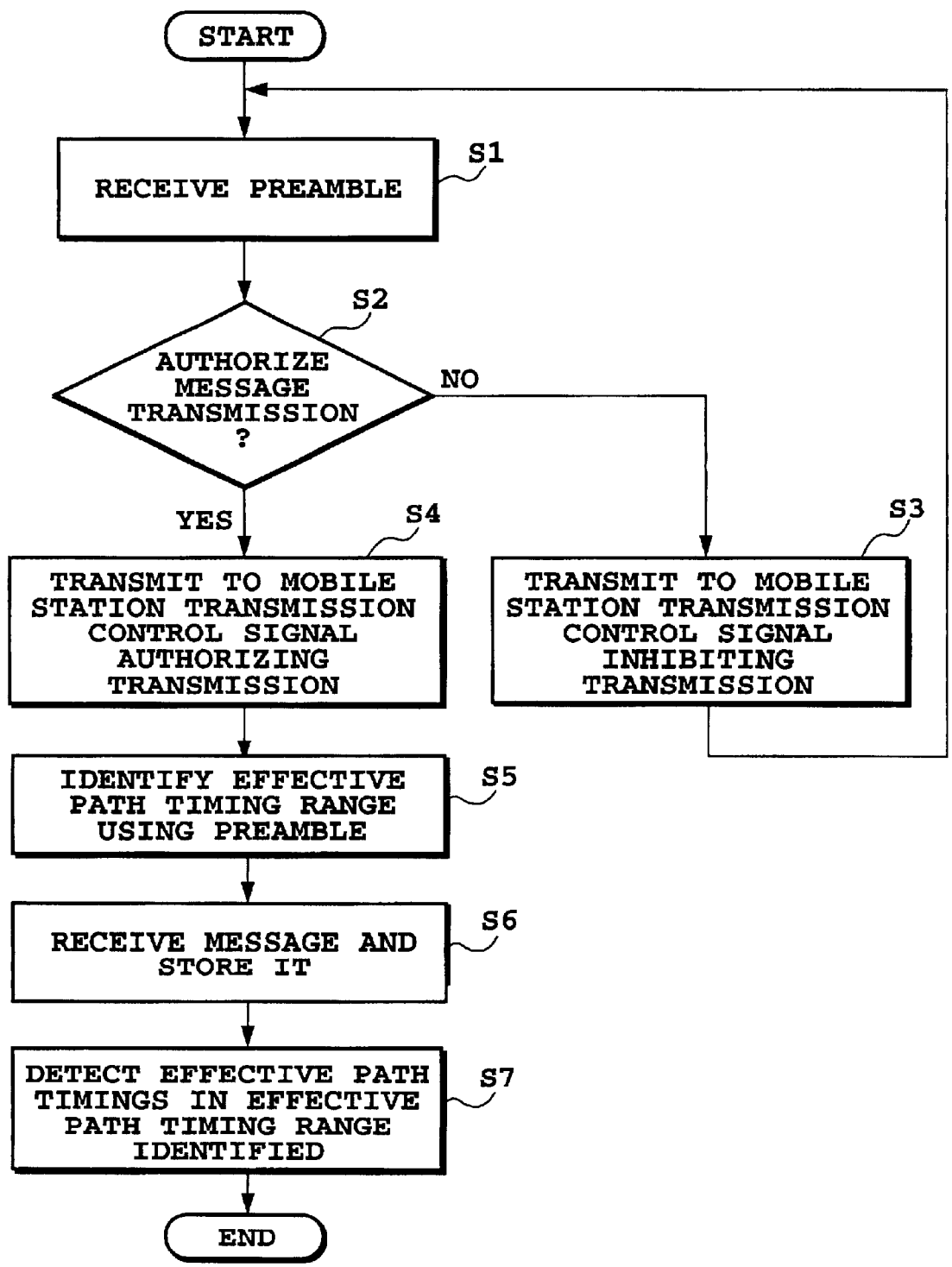
FIG. 2 is a flowchart illustrating a path detection procedure carried out by a base station.
Figure 3:
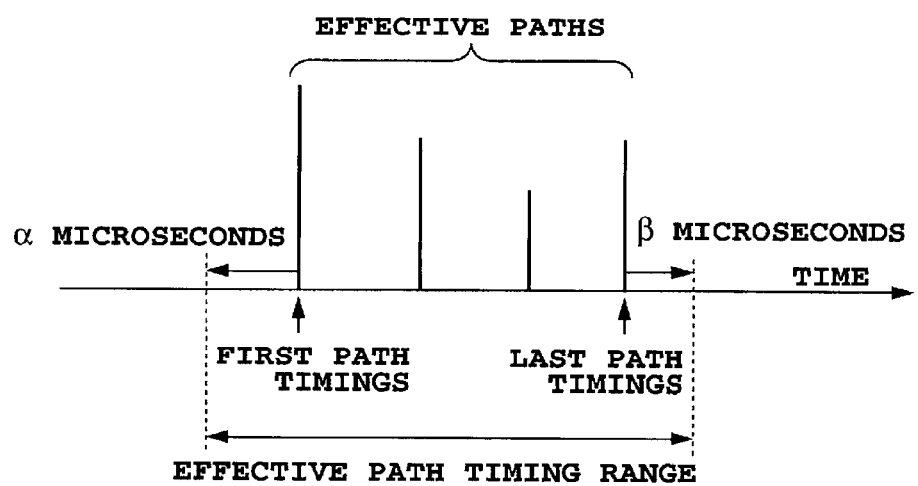
FIG. 3 is a diagram illustrating a method of identifying an effective path timing range.

Next, the path detecting processing in the base station 20 will be described with reference to FIGS. 2 and 3.

First, receiving a preamble transmitted from the mobile station 30 (step S1), the preamble detector 6 makes a decision as to whether to authorize the mobile station 30 to transmit the message or not, and commands the transmission control signal generator 8 to send the transmission control signal to the mobile station 30 that transmits the preamble (steps S2, S3 and S4). Specifically, when inhibiting the message transmission as a result of the decision at step S2, the base station 20 transmits to the mobile station 30 the transmission control signal inhibiting message transmission (step S3), and enters a waiting mode until it receives a next preamble.

On the other hand, when authorizing the message transmission, it transmits the transmission control signal authorizing the mobile station 30 to transmit the message (step S4), and identifies the effective range of the path timings using the received preamble (step S5 which will be described in detail later with reference to FIG. 3).

Receiving the transmission control signal authorizing the message transmission, the mobile station 30 transmits the message. The base station 20 receives the message and stores it (step S6), and the searcher 10 detects the effective path timings in the identified range (see, FIG. 3) (step S7). Specifically, the searcher 10 supplies the received message to a matched filter (not shown) to calculate the output of the matched filter using the path timing range identified by the preamble detector 6 as a searching range. It detects the timings at which multiple peaks are observed in the output of the matched filter as the effective path timings. Carrying out the detection of the effective path timings in this way, the searcher 10 supplies the path timings to the RAKE combiner 12.

Next, referring to FIG. 3, the identification processing of the path timing range at step S5 will be described. FIG. 3 illustrates relationships between effective paths and the effective range of the path timings in the base station 20. Receiving the preamble, the base station 20 detects the effective paths as illustrated in FIG. 3. As a result of the detection, the base station 20 decides the effective range of the path timings as ranging from a start point to an end point, in which the start point is placed at a timing α microsecond earlier than the initial effective path (shifted toward the left-hand side of FIG. 3), and the end point is placed at a timing β microsecond later than the final effective path.

As described above, according to the present invention, it can not only improve the accuracy of detecting the path timings, but also reduce the processing load as compared with a method in which the path timings are detected from the entire searching range corresponding to a cell radius. More specifically, it can offer the following distinguishing advantages.

(1) It can implement more accurate, more effective path timing detection than the conventional method that carries out the path timing detection using only the preamble. Specifically, in contrast to the conventional path timing detecting method using only the preamble, the present invention identifies the effective range of the path timings using the preamble, first, and then detects the effective path timings in the identified path timing range at the subsequent message reception. This enables more accurate path timing detection than the conventional path detection method using only the preamble. In addition, since the present invention identifies the searching range at the preamble reception, it can reduce the processing load as compared with the method of detecting the path timings in the entire searching range corresponding to a cell radius.

(2) Identifying the range, which is obtained by expanding the timing range of the effective paths detected using the preamble, by the fixed time periods (α and β microseconds each) as the effective path timing range makes it possible to reduce the probability of overlooking the path timings to be detected in the limited searching range.

The present invention has been described in detail with respect to the preferred embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A path timing detecting method in a mobile communications system, in which when a plurality of mobile stations access a base station using a common channel at arbitrary timings, each mobile station transmits a preamble for notifying the base station of an occurrence of a message before actually transmitting the message, the base station transmits, in response to reception of the preamble, a transmission control signal authorizing the mobile station to transmit the message, and the mobile station that receives the transmission control signal starts transmitting the message, said path timing detecting method comprising:

a step of identifying an effective path timing range using the preamble received by base station; and a step of detecting effective path timings in the identified path timing range using the message transmitted from the mobile station, wherein the step of identifying the effective path timing range determines the effective path timing range as ranging from a start point to an end point, the start point being placed at a timing previous to an earliest one of the path timings detected from the preamble received by the base station by a first time period, and the end point being placed at a timing later than a latest one of the path timings by a second time period.

2. A base station in a mobile communications system, in which when a plurality of mobile stations access the base station using a common channel at arbitrary timings, a mobile station transmits a preamble for notifying the base station of an occurrence of a message before actually transmitting the message, the base station transmits, in response to reception of the preamble, a transmission control signal authorizing the mobile station to transmit the message, and the mobile station that receives the transmission control signal starts transmitting the message, said base station comprising:

identifying means for identifying an effective path timing range using the preamble received; and detecting means for detecting effective path timings in the identified path timing range using the message transmitted from the mobile station, wherein said identifying means determines the effective path timing range as ranging from a start point to an end point, the start point being placed at a timing previous to an earliest one of the path timings detected from the preamble received by the base station by a first time period, and the end point being placed at a timing later than a latest one of the path timings by a second time period.

3. A mobile communications system in which a plurality of mobile stations access a base station at any arbitrary timings using a common channel, wherein said mobile stations each comprises:

means for transmitting a preamble for notifying said base station of an occurrence of a message before actually transmitting the message, and wherein said base station comprises:

means for transmitting, in response to the reception of the preamble sent from said mobile station, a transmission control signal authorizing said mobile station to transmit the message:

identifying means for identifying an effective path timing range from the preamble: and detecting means for detecting effective path timings in the identified path timing range using the message sent from said mobile station, wherein said identifying means determines the effective path timing range as ranging from a start point to an end point, the start point being placed at a timing previous to an earliest one of the path timings detected from the preamble received by the base station by a first time period, and the end point being placed at a timing later than a latest one of the path timings by a second time period.

4. A storing medium that stores, in a form of a communication control program, a path timing detecting method in a mobile communications system, in which when a plurality of mobile stations access a base station using a common channel at arbitrary timings, a mobile station transmits a preamble for notifying the base station of an occurrence of a message before actually transmitting the message, the base station transmits, in response to reception of the preamble, a transmission control signal authorizing the mobile station to transmit the message, and the mobile station that receives the transmission control signal starts transmitting the message, said path timing detecting method comprising: a step of identifying an effective path timing range using the preamble received by base station: and a step of detecting effective path timings in the identified path timing range using the message transmitted from the mobile station, wherein the step of identifying the effective path timing range determines the effective path timing range as ranging from a start point to an end point, the start point being placed at a timing previous to an earliest one of the path timings detected from the preamble received by the base station by a first time period, and the end point being placed at a timing later than a latest one of the path timings by a second time period.

* * * * *

UNITED STATES PATENT AND TRADEMARK OFFICE
CERTIFICATE OF CORRECTION

| | | |
|---|---|---|
| PATENT NO. | : 6,980,807 B2 | Page 1 of 1 |
| APPLICATION NO. | : 09/750814 | |
| DATED | : December 27, 2005 | |
| INVENTOR(S) | : Ishii et al. | |

It is certified that error appears in the above-identified patent and that said Letters Patent is hereby corrected as shown below:

Title Page
Title page, Item 56, References Cited, OTHER PUBLICATIONS, add the following publication.  --Mamami Ishii, et al., "Path–Search Performance Of DS–CDMA System In Lboratory And Field Experiments," IEICE General Convention 1998, B–5–52, p. 437, March 2000.--

Column 1
Line 53, change "massage" to --message--

Column 3
Line 46, before "effective path timings" remove "an"

Column 5
Line 14, before "base station" insert --the--

Column 6
Line 40, before "base station" insert --the--

Signed and Sealed this

Twenty-fourth Day of April, 2007

JON W. DUDAS
*Director of the United States Patent and Trademark Office*